Patented Aug. 3, 1926.

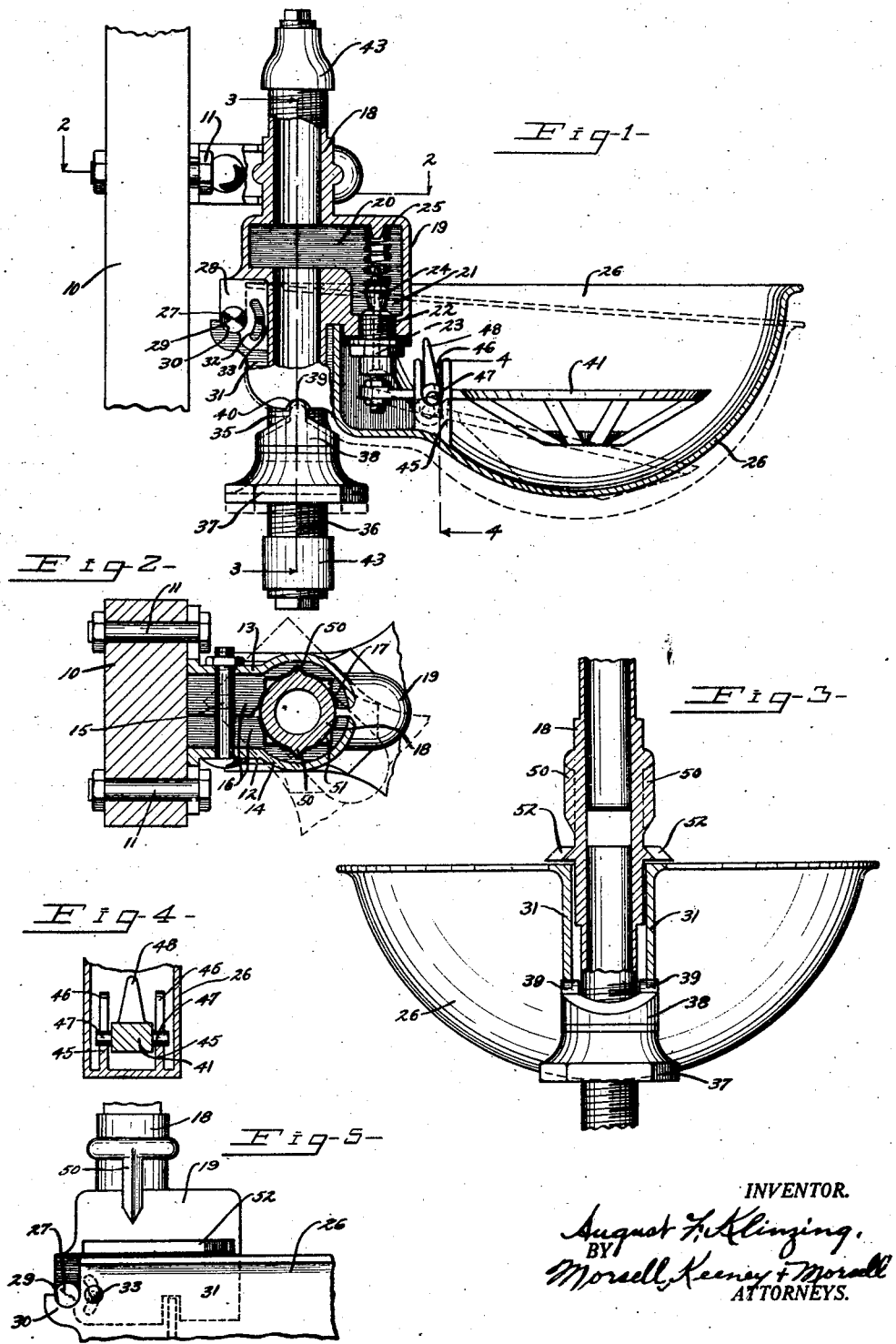

1,594,966

UNITED STATES PATENT OFFICE.

AUGUST F. KLINZING, OF MILWAUKEE, WISCONSIN.

ANIMAL DRINKING FOUNTAIN.

Application filed July 28, 1924. Serial No. 728,649.

This invention relates to animal drinking fountains, and more particularly to a drinking fountain of the type in which the flow of water thereto is controlled by the animal, and has for one of its objects to provide a device of this character which will be simple in construction, comparatively inexpensive to manufacture and install and more efficient in use than those which have been heretofore proposed.

The invention has reference particularly to the type of fountain shown, described and claimed in my co-pending application filed July 28, 1924, Serial Number 728,650, entitled Drinking fountains for animals, but it may be distinguished therefrom by the fact that in the present instance the bowl, while being detachable, is not readily removable, as is the case in the said co-pending application, and furthermore, the means for controlling the pivotal movement of the bowl for the purpose of rendering the valve inoperative at times, is of somewhat different construction.

Provision is also made, in the present case, whereby water may be introduced into the valve member from either above or below and the animal actuated valve controlling lever is also provided with means whereby its accidental displacement from its pivot by the animal may be prevented.

With the above and other objects in view, which will appear as the description proceeds, the invention consists in the novel details of construction, combinations and arrangements of parts, more fully hereinafter described and particularly pointed out in the appended claims.

Referring to the accompanying drawings in which like reference characters designate like parts in all the views, Figure 1 is a central vertical sectional view, partly in elevation, of a drinking fountain constructed in accordance with the present invention;

Fig. 2 is a fragmentary horizontal sectional view of the parts shown in Fig. 1, taken approximately on the plane indicated by the line 2—2 in the said figure, looking down;

Fig. 3 is a vertical sectional view, also partly in elevation, taken approximately on the plane indicated by the line 3—3 of Fig. 1, looking in the direction of the arrows;

Fig. 4 is a fragmentary detail sectional view through the pivots of the animal actuated valve controlling lever, taken approximately on the plane indicated by the line 4—4 of Fig. 1; and, Fig. 5 is a fragmentary side elevational view of a portion of the valve housing and of the bowl showing the pivotal connections between the two.

In the said drawings, the numeral 10 indicates a stanchion or other suitable support, to which is secured, as by the bolts 11, a clamping bracket 12, comprising the separable members, 13 and 14, normally held together in clamping position by the clamping bolt 15. The said members are provided with the inwardly extending webs or flanges 16, which are cut away, as indicated at 17, to provide a substantially circular opening for receiving the upwardly extending nipple member 18 of the valve casing or housing 19. The said housing or casing is provided with a valve chamber 20 which chamber has a downward extension 21 into which projects a portion of a plug 22, which serves as a bearing for a valve stem 23, which is slidably mounted therein, and which carries at its upper end, a valve member 24, which is normally urged downwardly to seat upon the upper end of the plug 22 by means of the coiled spring 25, see Fig. 1.

As above stated, the bowl in the present instance, instead of being readily removably secured to the valve casing or housing, is pivotally mounted thereon in such a manner that it may be detached therefrom if necessary, although it is not contemplated that it can be removed with the same facility as in the said co-pending application.

The connections whereby the bowl 26 is secured to the valve casing 19 comprise the studs or trunnions 27, projecting laterally from the flanges or webs 28 of the valve housing, which trunnions are adapted to be received in the substantially semi-circular recesses 29 formed in the hooked portions 30 of the ears or flanges 31, with which the bowl 26 is provided. The webs 28 of the valve casing are provided with arcuate slots 32, through which passes a pin 33, which is rigidly carried by the ears or flanges 31 of the bowl member 26. The said pin and slot connection, while preventing the ready removal of the bowl from the valve member, at the same time serves to guide the said bowl in its pivotal movements about the trunnions 27, and in case of necessity the bowl may be removed by driving out the pin 33 to permit of the disengagement of the parts, as will be readily understood.

As in the said co-pending application, it is contemplated that the action of the valve 24 may be controlled so that the said valve may be rendered inoperative when desired, by merely dropping the bowl 26 a slight distance, as indicated in dotted lines in Fig. 1. The means for controlling these pivotal movements, as above stated, are somewhat different from those shown in the said co-pending application, and comprise the downwardly extending nipple or pipe 35, rigid with the valve casing 19. The said nipple or pipe is exteriorly threaded, as indicated at 36, and carries thereon a thumb nut 37, above which is mounted a washer member 38, provided with a pair of diametrically opposed projections 39, which are adapted to be received in notches or recesses 40, cut in the lower edges of the flanges or ears 31 of the bowl member. It thus results that by backing off on the thumb nut 37, the bowl may be dropped from its full line position to its dotted line position illustrated in Fig. 1, thereby rendering the animal actuated valve controlling lever 41 inoperative in the same manner as that disclosed in my said copending application.

As above stated, in the present instance, provision is made whereby water may be fed into the valve chamber 20 either from above or below, so as to accommodate the fountain to existing systems of piping. This is accomplished by making the nipple 18 of the valve member, as well as the nipple member 35 thereof, hollow, as clearly shown in Fig. 1, so that the water supply pipe may be connected to either one or the other of the said nipples, as conditions may require. Of course, the nipple which is not so connected to the water supply will be closed by a cap member, such as 43, as will be readily understood.

As was also above stated, provision is made whereby the valve controlling lever 41 may be prevented from becoming displaced by movements of the animal in drinking, this means comprising the pivot lugs 45, see Figs. 1 and 4, which are bifurcated at their upper ends, as indicated at 46, to receive the pivot studs 47 of the said lever 41. The said lever is also provided with a lug or projection 48, which oscillates between the said lugs, which will serve to prevent the animal from nosing under the lever 41 and disengaging its pivots from the recesses 46 of the lugs 45.

As in the said co-pending application, provision is made whereby the bowl member 26 and the valve housing may be adjusted angularly in a horizontal plane relative to the bracket member 12 so as to position the fountain in the most convenient place for the animals. This said means, as in the copending application, comprises the vertical ribs 50, formed upon the nipple 18, see Figs. 2 and 5, which ribs are adapted to be received in corresponding recesses 51, formed around the circumference of the opening 17, which receives the said nipple. Also, as was disclosed in the said co-pending application, the laterally projecting flanges 52 are provided upon the sides of the valve casing or housing for assisting in positioning and retaining the bowl member 26 in operative position.

While one form of the invention has been illustrated and described, it is obvious that those skilled in the art may vary the details of construction as well as the arrangement of parts without departing from the spirit of the invention, and therefore it is not wished to be limited to the above disclosure except as may be required by the accompanying claims.

What is claimed is:

1. A drinking fountain for animals comprising a valve provided with a casing; a pair of trunnions carried by said casing; a bowl pivotally mounted on said trunnions; a pin and slot connection between said bowl and casing for retaining the parts in operative relation; means for controlling said valve; and means for adjusting said bowl upon said trunnions to render said valve controlling means operative and inoperative at will.

2. A drinking fountain for animals comprising a valve provided with a casing; a pair of laterally projecting trunnions carried by said casing; a bowl having hook portions providing recesses for receiving said trunnions, whereby said bowl may be pivotally mounted relative to said casing; a pin and arcuate slot connection between said bowl and casing for retaining the parts in operative relation; means within said bowl for controlling said valve; and threaded means rigidly carried by said casing for adjusting the position of said bowl upon said trunnions to render said valve controlling means operative and inoperative at will.

3. In a drinking fountain for animals, a valve provided with a casing having a pair of spaced flanges, each provided with a laterally extending trunnion and with an arcuate slot concentric therewith; a bowl provided with a pair of spaced ears embracing said flanges and having hook portions providing recesses receiving said trunnions, whereby said bowl is pivotally mounted relative to said casing; a pin carried by said ears, passing through said slots, for retaining said bowl in operative relation to said casing; means within said bowl for controlling said valve; and means carried by said casing for controlling the vertical position of said bowl, to render said valve controlling means operative and inoperative at will.

4. In a drinking fountain for animals, a valve provided with a casing having alternative inlet passages; a bowl pivotally carried by said casing; means within said bowl for controlling said valve; and means for controlling the pivotal movements of said bowl, whereby said valve controlling means may be rendered operative and inoperative at will.

5. In a drinking fountain for animals, a valve provided with a casing having a pair of oppositely disposed nipples providing alternative inlet passages; a bowl pivotally carried by said casing; means within said bowl for controlling said valve; and means carried by one of said nipples for controlling the pivotal movements of said bowl, whereby said valve controlling means may be rendered operative and inoperative at will.

6. In a drinking fountain for animals, a valve provided with a casing having a pair of oppositely vertically disposed nipples providing alternative inlet passages; a bowl pivotally carried by said casing; means within said bowl for controlling said valve; and means comprising a nut threaded on one of said nipples and a washer engaging said nut and said bowl, for controlling the vertical position of said bowl, whereby said valve controlling means may be rendered operative and inoperative at will.

7. In a drinking fountain for animals, a valve provided with a casing; a bowl carried by said casing in position to receive water from said valve, said bowl being provided with a pair of bifurcated lugs; an animal actuated valve controlling lever within said bowl, provided with pivot studs received in said bifurcated lugs; and a projection on said lever adjacent said studs.

In testimony whereof, I affix my signature.

AUGUST F. KLINZING.